US00RE48162E

(19) United States
(12) Reissued Patent
Colston

(10) Patent Number: US RE48,162 E
(45) Date of Reissued Patent: Aug. 18, 2020

(54) GRILL HANDLE TOWEL BAR ASSEMBLY

(71) Applicant: Traeger Pellet Grills LLC, Salt Lake City, UT (US)

(72) Inventor: Michael Colston, Salt Lake City, UT (US)

(73) Assignee: Traeger Pellet Grills, LLC, Salt Lake City, UT (US)

(21) Appl. No.: 29/668,943

(22) Filed: Nov. 2, 2018

Related U.S. Patent Documents

Reissue of:
(64) Patent No.: Des. 827,368
Issued: Sep. 4, 2018
Appl. No.: 29/539,828
Filed: Sep. 17, 2015

(51) LOC (12) Cl. ..... 07-02
(52) U.S. Cl.
USPC ..... D7/402; D8/316
(58) Field of Classification Search
USPC ..... D7/332–337, 352, 353, 393, 407–411; D6/523, 524, 549; D8/315–320; D15/89; D23/304; D32/3
CPC .. A47J 37/067; A47J 37/0694; A47J 37/0786; A47J 37/0704; A47J 37/0713; A47J 37/0781; A47J 37/0777; A47J 37/0763; A47J 37/0611; A47J 37/0709; A47J 37/0676; F24C 15/16
See application file for complete search history.

(56) References Cited

U.S. PATENT DOCUMENTS

| | | | | |
|---|---|---|---|---|
| 2,374,787 A | | 5/1945 | Spiegel et al. | A47K 10/04 211/105.1 |
| D179,940 S | * | 3/1957 | Gulliksen | D8/319 |
| D254,461 S | | 3/1980 | Raymond | D6/549 |

(Continued)

FOREIGN PATENT DOCUMENTS

| | | |
|---|---|---|
| CA | 70139 A | 2/1901 |
| CA | 113271 A | 7/1908 |

(Continued)

OTHER PUBLICATIONS http://www.homedepot.com/p/Franklin-Brass-Futura-24-in-Towel-Bar-in-Polished-Chrome-D2424PC/100388815; Home Depot; Franklin Brass, Futura 24 in. Towel Bar in Polished Chrome; Sep. 6, 2015.

(Continued)

*Primary Examiner* — Darlington Ly
(74) *Attorney, Agent, or Firm* — TraskBritt

(57) CLAIM

The ornamental design for a grill handle towel bar assembly, as shown and described.

DESCRIPTION

FIG. 1 is a front, left perspective view of my new design for a grill handle towel bar assembly shown in a grilling environment;
FIG. 2 is a top, right perspective view of the grill handle towel bar assembly of FIG. 1;
FIG. 3 is a front elevation view thereof;
FIG. 4 is a rear elevation view thereof;
FIG. 5 is a top plan view thereof;
FIG. 6 is a bottom plan view thereof;
FIG. 7 is a left side elevation view thereof;
FIG. 8 is a right side elevation view thereof; and,
FIG. 9 is a top, front, left perspective exploded view thereof.
The broken lines in the drawings depict environmental subject matter only and form no part of the claimed design.

1 Claim, 6 Drawing Sheets

Figure 1:
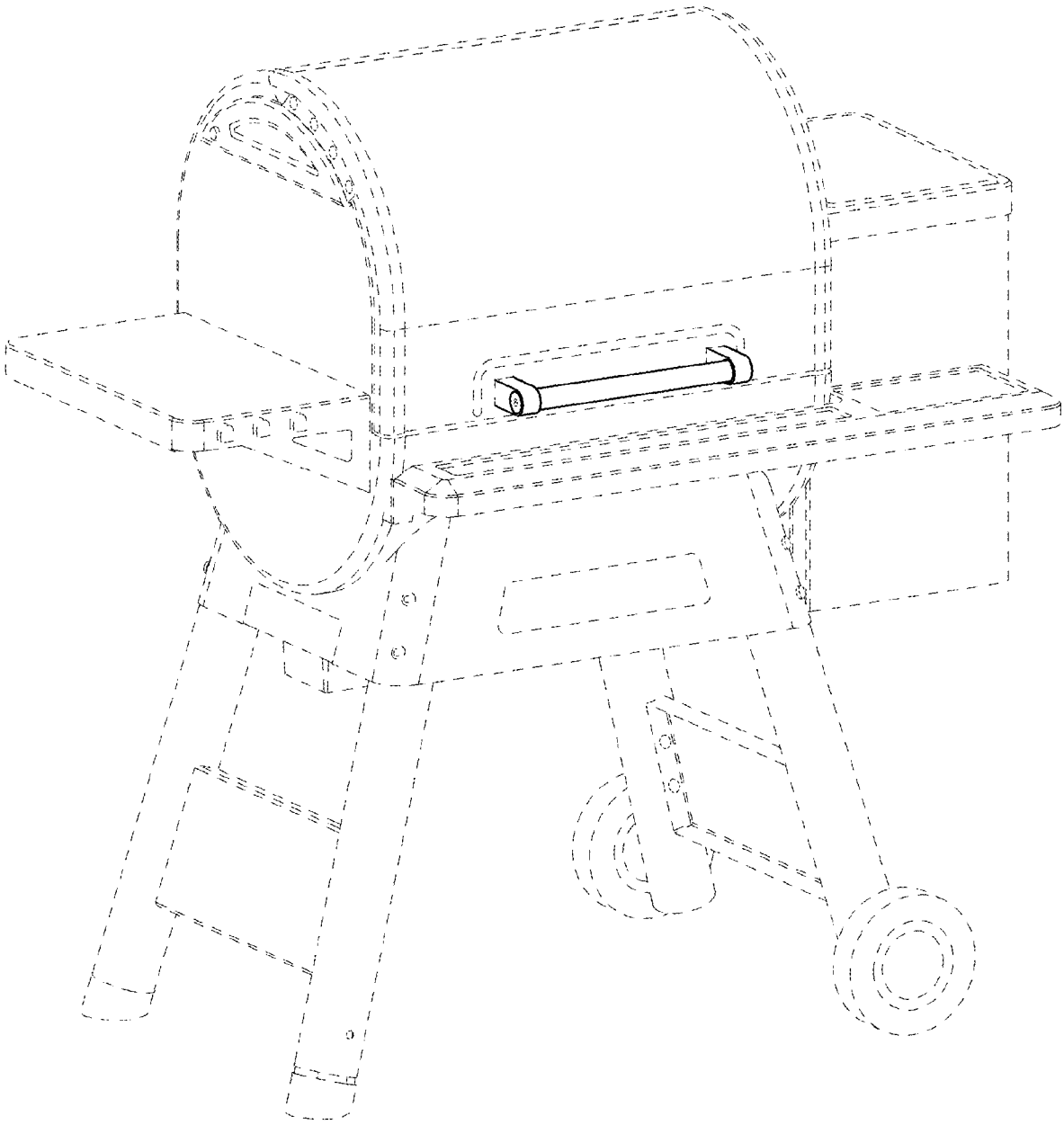
Figure 2:
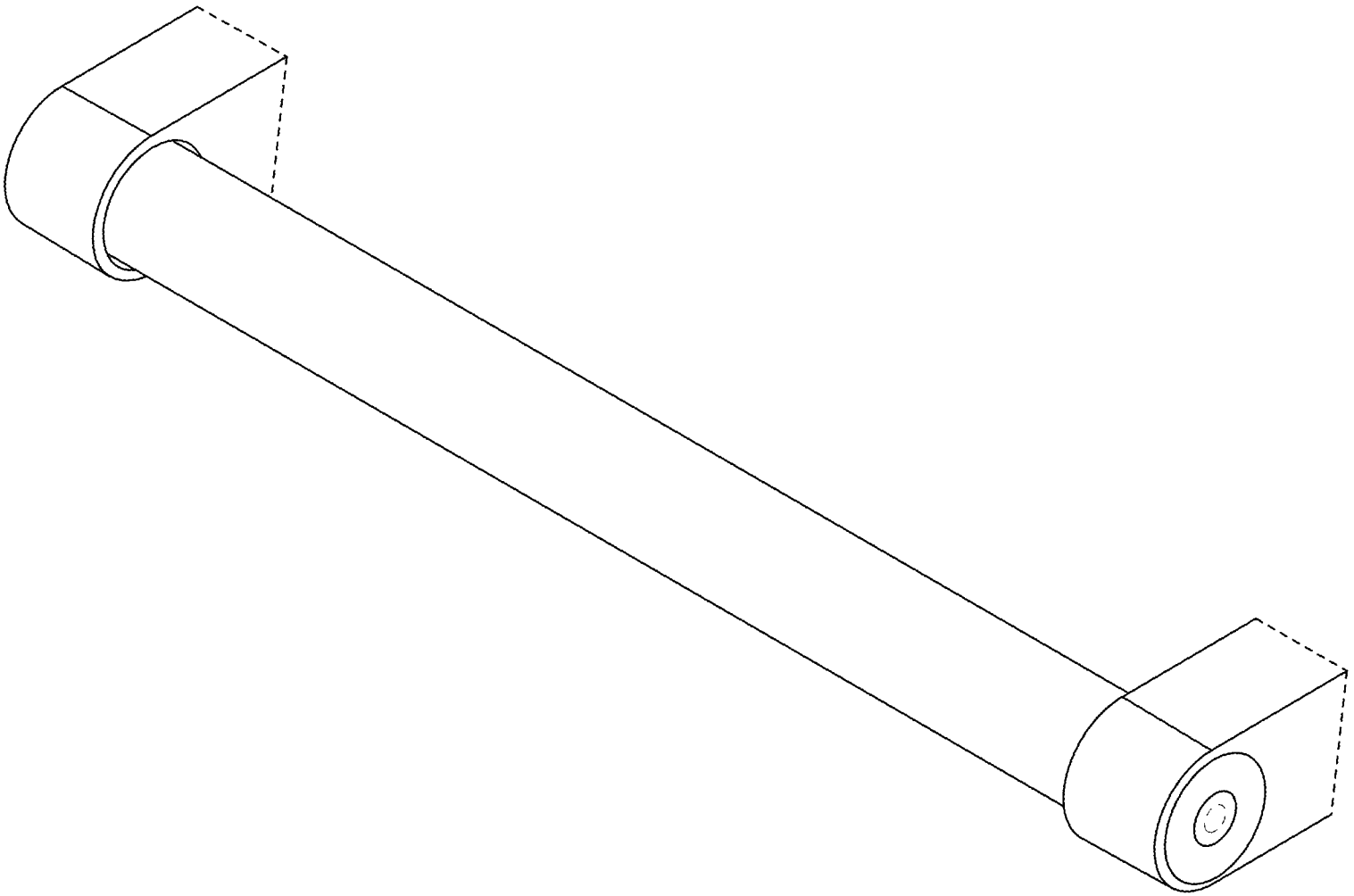
Figure 3:
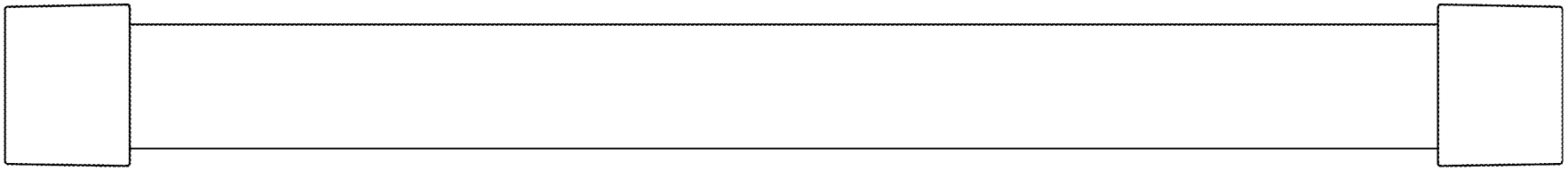
Figure 4:
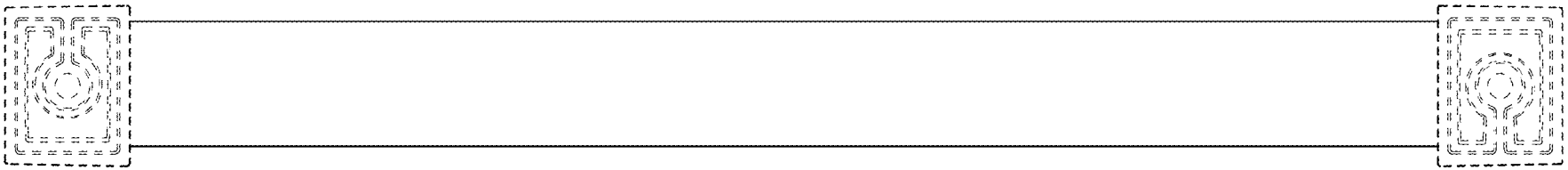
Figure 5:
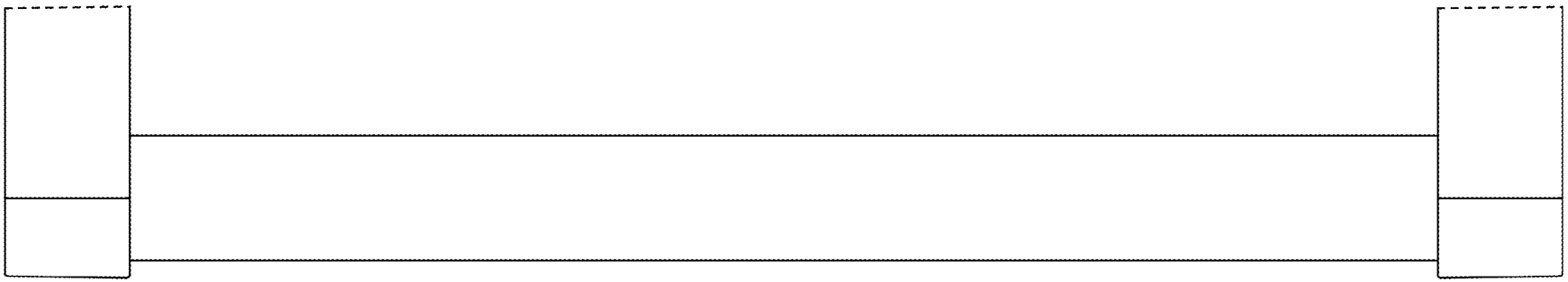
Figure 6:
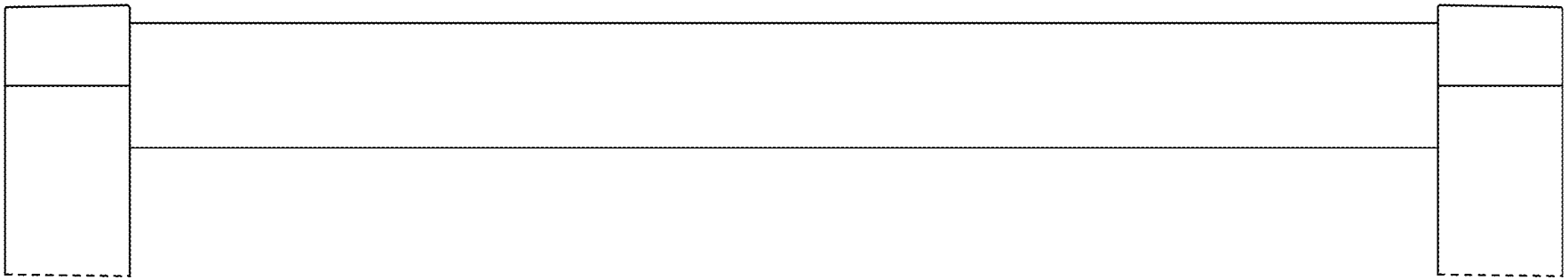
Figure 7:
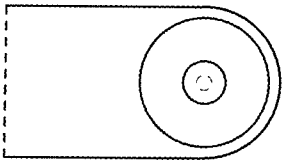
Figure 8:
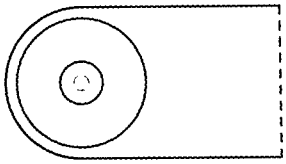

Matter enclosed in heavy brackets [ ] appears in the original patent but forms no part of this reissue; matter printed in italics indicates the additions made by reissue.

(56) References Cited

U.S. PATENT DOCUMENTS

| | | | | | |
|---|---|---|---|---|---|
| D258,228 | S | * | 2/1981 | Rumbaugh | D15/18 |
| D270,433 | S | | 9/1983 | Sun | D11/129 |
| D271,658 | S | | 12/1983 | Legerius et al. | D8/107 |
| D274,123 | S | * | 6/1984 | Tegner | D8/316 |
| D334,315 | S | * | 3/1993 | Bengtson | D23/304 |
| 5,860,538 | A | | 1/1999 | Duero | A47K 10/08 16/436 |
| 5,887,200 | A | | 3/1999 | Aoyama | G03B 13/02 396/50 |
| D433,141 | S | | 10/2000 | Nash et al. | D24/189 |
| D433,144 | S | | 10/2000 | Park | D24/203 |
| D455,034 | S | * | 4/2002 | Ou-Young | D6/523 |
| D469,185 | S | | 1/2003 | Lodge | D24/224 |
| 6,810,792 | B1 | | 11/2004 | Knight | A47J 36/38 99/340 |
| D516,350 | S | | 3/2006 | Chen | D6/549 |
| D516,368 | S | | 3/2006 | Zhang | D7/337 |
| D525,829 | S | | 8/2006 | Chung | D7/402 |
| D534,755 | S | | 1/2007 | Knight | D7/332 |
| D546,619 | S | * | 7/2007 | McHutchison | D7/352 |
| D549,038 | S | | 8/2007 | Chung | D7/337 |
| D564,729 | S | | 3/2008 | Fisher | D7/402 |
| D568,100 | S | * | 5/2008 | Jeon | D7/402 |
| D572,109 | S | | 7/2008 | Busalt et al. | D8/316 |
| D572,111 | S | | 7/2008 | Busalt | D8/316 |
| D586,448 | S | * | 2/2009 | Lammel | D23/304 |
| D611,292 | S | | 3/2010 | Chung | D7/337 |
| D618,036 | S | | 6/2010 | Chung | D7/334 |
| D654,311 | S | * | 2/2012 | Benold | D7/402 |
| 9,089,245 | B1 | | 7/2015 | Pamphilis | A47K 10/04 |
| D745,362 | S | * | 12/2015 | Grasselli | D8/315 |
| D758,827 | S | | 6/2016 | Grasselli | D8/315 |
| D764,230 | S | * | 8/2016 | Shoemaker | D7/405 |
| D781,642 | S | * | 3/2017 | Incukur | D7/393 |
| D785,366 | S | * | 5/2017 | Andrew | D6/549 |
| D791,418 | S | * | 7/2017 | Warren | D32/3 |
| D796,250 | S | | 9/2017 | Chung | D7/337 |
| D802,353 | S | | 11/2017 | Chung | D7/337 |
| 2005/0284590 | A1 | | 12/2005 | Mariconti | A47K 10/02 160/349.1 |
| 2007/0017384 | A1 | * | 1/2007 | Serra | A47J 37/0611 99/372 |
| 2008/0121598 | A1 | | 5/2008 | Brinson | A47K 10/04 211/88.04 |
| 2009/0236299 | A1 | | 9/2009 | Hall | A47K 10/02 211/16 |
| 2009/0308260 | A1 | * | 12/2009 | Trost | A47J 37/0611 99/349 |
| 2016/0081519 | A1 | | 3/2016 | Manko | A47K 10/04 211/16 |

FOREIGN PATENT DOCUMENTS

| | | | |
|---|---|---|---|
| CA | 70139 | | 2/1992 |
| CA | 112390 | | 1/2007 |
| CA | 113271 | | 2/2007 |
| CA | 121566 | | 3/2009 |
| CA | 151895 | | 2/2015 |
| CN | 202179490 | | 4/2012 |
| CN | 202179490 | U | 4/2012 |
| CN | 202179491 | | 4/2012 |
| CN | 202179491 | U | 4/2012 |
| CN | 302552715 | | 8/2013 |
| CN | 201330053210 | | 8/2013 |
| DE | 36399965 | | 9/1987 |
| DE | 36399965 | | 5/1988 |
| DE | M9107853-0006 | | 5/1992 |
| DE | M9207084-0022 | | 7/1993 |
| DE | M9309983-0002 | | 7/1994 |
| DE | M9400240-0016 | | 7/1994 |
| DE | M9400134-001 | | 8/1994 |
| DE | M9400134-0001 | | 8/1994 |
| DE | M9400134-0003 | | 8/1994 |
| DE | M9704177-0032 | | 10/1997 |
| DE | M9704177-0032.1 | | 10/1997 |
| DE | M9704177-0035 | | 10/1997 |
| DE | M9704177-0035.1 | | 10/1997 |
| DE | M9704177-0036 | | 10/1997 |
| DE | M9704177-0036.1 | | 10/1997 |
| DE | M9704790-0018 | | 12/1997 |
| DE | M9705758-0001 | | 12/1997 |
| DE | M9705758-0001.1 | | 12/1997 |
| DE | M9801713-0001 | | 10/1998 |
| DE | M9801713.0001.1 | | 10/1998 |
| DE | M9806095-0005 | | 1/1999 |
| DE | 49809674-0007 | | 5/1999 |
| DE | 49904101-0008 | | 8/1999 |
| DE | 49904101-0008.1 | | 8/1999 |
| DE | 49904101-0009 | | 8/1999 |
| DE | 49904101-0009.1 | | 8/1999 |
| DE | 49904101-0015 | | 8/1999 |
| DE | 49904101-0015.1 | | 8/1999 |
| DE | 49904356-0002 | | 11/1999 |
| DE | 49904356-0002.1 | | 11/1999 |
| DE | 49908015-0005 | | 1/2000 |
| DE | 49908015-0005.1 | | 1/2000 |
| DE | 40002388-0002 | | 7/2000 |
| DE | 40002388-0002.1 | | 7/2000 |
| DE | 49907614-0019 | | 8/2000 |
| DE | 49907614-0019.1 | | 8/2000 |
| DE | 499076414-0016 | | 8/2000 |
| DE | 40008059-0011 | | 4/2001 |
| DE | 40008059-0011.1 | | 4/2001 |
| DE | 40006705-0012 | | 5/2001 |
| DE | 40006795-0012.1 | | 5/2001 |
| DE | 40101468-0008 | | 9/2001 |
| DE | 40101468-0008.1 | | 9/2001 |
| DE | 40101468-0011 | | 9/2001 |
| DE | 40101468-0011.1 | | 9/2001 |
| DE | 40101379-0005 | | 2/2002 |
| DE | 40101379-0005.1 | | 2/2002 |
| DE | 40101379-0006 | | 2/2002 |
| DE | 40101379-0006.1 | | 2/2002 |
| DE | 40104477-0046 | | 2/2002 |
| DE | 40104477-0046.1 | | 2/2002 |
| DE | 40201060-0023 | | 7/2002 |
| DE | 499076414-0016.1 | | 8/2002 |
| DE | 40201262-0011 | | 10/2002 |
| DE | 40201262-0011.1 | | 10/2002 |
| DE | 40205869-0040 | | 11/2002 |
| DE | 40205869-0040.1 | | 11/2002 |
| DE | 40205869-0041 | | 11/2002 |
| DE | 40205869-0041.1 | | 11/2002 |
| DE | 40205869-0042 | | 11/2002 |
| DE | 40205869-0042.1 | | 11/2002 |
| DE | 40205869-0043 | | 11/2002 |
| DE | 40205869-0043.1 | | 11/2002 |
| DE | 40302619-0010 | | 11/2003 |
| DE | 40302619-0010.1 | | 11/2003 |
| DE | 000303706-0014 | | 5/2005 |
| DE | 000514765-0005 | | 6/2006 |
| DE | 000148242-0005 | | 8/2006 |
| DE | 40706296-0006 | | 6/2008 |
| DE | 402008001567-000 | | 7/2008 |
| DE | 402008001567-0008 | | 7/2008 |
| DE | 202010009932 | | 10/2010 |
| DE | 202010009932 | U1 | 10/2010 |
| DE | 001223739-0025 | | 12/2010 |
| DE | 001831710-0012 | | 3/2011 |
| DE | 402011005347-001 | | 1/2012 |
| DE | 402011005347-0018 | | 1/2012 |
| DE | 001223739-0022 | | 1/2013 |
| DE | 402012005581-001 | | 4/2013 |
| DE | 402012005581-0014 | | 4/2013 |
| DE | 002200527-0025 | | 5/2013 |
| DE | 402014000227-000 | | 3/2014 |
| DE | 402014000227-0007 | | 3/2014 |
| DE | 402014001067-000 | | 5/2014 |
| DE | 402014001067-0003 | | 5/2014 |
| DE | 402014001067-0004 | | 5/2014 |
| DE | 402015200850-000 | | 5/2015 |
| DE | 402015200850-0001 | | 5/2015 |
| DE | 402015200850-0002 | | 5/2015 |

(56) References Cited

FOREIGN PATENT DOCUMENTS

| | | | |
|---|---|---|---|
| DE | 402015200850-0003 | | 5/2015 |
| EM | 000514765-0001 | | 4/2006 |
| EM | 000514765-0003 | | 4/2006 |
| EM | 000514765-0001 | | 6/2006 |
| EM | 000514765-0003 | | 6/2006 |
| EM | 000563804-0008 | | 7/2006 |
| EM | 000563804-0008 | | 8/2006 |
| EM | 000662895-0003 | | 2/2007 |
| EM | 000662895-0003 | | 3/2007 |
| EM | 000798384-0002 | | 9/2007 |
| EM | 000798384-0002 | | 11/2007 |
| EM | 000856984-0031 | | 1/2008 |
| EM | 000856984-0031 | | 2/2008 |
| EM | 001019095-0002 | | 10/2008 |
| EM | 001019095-0002 | | 11/2008 |
| EM | 001895103-0004 | | 7/2011 |
| EM | 002589747-0004 | | 12/2014 |
| EM | 002589747-0005 | | 12/2014 |
| ES | 10148775-0001 | | 1/2001 |
| ES | D0501475 | | 8/2005 |
| ES | D0506386-0012 | | 8/2008 |
| JP | 1201276 | | 2/2004 |
| JP | 1201276 | | 4/2004 |
| JP | 2004-251301 | A | 9/2004 |
| JP | 2004251301 | | 9/2004 |
| JP | 2008-119242 | A | 5/2008 |
| JP | 2008119242 | | 5/2008 |
| JP | 1394160 | | 8/2010 |
| JP | 1411633 | | 4/2011 |
| JP | 2012-040249 | A | 3/2012 |
| JP | 2012049249 | | 3/2012 |
| JP | 1495807 | | 4/2014 |
| JP | 1544590 | | 2/2016 |
| KR | 20-2011-0008876 | | 9/2011 |
| KR | 20110008876 | | 9/2011 |
| KR | 20-0458901 | | 3/2012 |
| KR | 10-2013-0021618 | A | 3/2013 |
| KR | 20130021618 | | 3/2013 |
| NZ | 406168 | | 6/2005 |
| PL | 05460 | | 7/2004 |
| PL | RP.05460 | | 7/2004 |
| TW | 457922 | | 10/2001 |
| TW | M518059 | | 3/2016 |
| WO | DM/048593 | | 12/1999 |
| WO | 065312 | | 5/2004 |
| WO | 65312 | | 5/2004 |
| WO | DM/066389 | | 8/2005 |
| WO | 67435 | | 2/2006 |
| WO | 067435 | | 2/2006 |

OTHER PUBLICATIONS http://www.grapevinesally.com/vintage-gaffers-sattler-gas-stove-part-short-oven-door-handle/; Grapevine Sally; Gaffers & Sattler; Vintage Gaffers & Sattler Gas Stove Part—Short Oven Door Handle; Jun. 15, 2015.

https://www.appliancefactoryparts.com/gasgrillparts/brands/brinkmann/810-3-810-s.html; Appliance Factory Part; Brinkmann 810-3810-S; Jul. 2, 2015.

https://www.appliancefactoryparts.com/gasgrillparts/brands/brinkmann/810-3214-0.html; Appliance Factory Part; Brinkman 810-3214-0; Sep. 6, 2015.

http://tvwbb.com/showthread.php?40489-My-Genesis-1000-red-head-is-donel; The Virtual Weber Bulletin Board; Thread: My Genesis 1000 red head is done!; Apr. 17, 2015.

https://www.caterkwik.cauk/cgi-bin/trolleyed_public.cgi?action=showprod_ARCHWAY3BSCL; Cater-Kwik; Archway 3BS/3BL 3 Burner Classic Charcoal Grill; Jul. 2, 2013.

http://home.howstuffworks.com/grill.htm; Howstuffworks Home & Garden; How Grills Work; Sep. 6, 2015.

http://www.houzz.com/photos/188288/Wolf-42-Outdoor-Gas-Grill-outdoor-grills; Houzz; Wolf 42" Outdoor Gas Grill; Dec. 26, 2014.

http://www.bbqguys.com/item_item_2881068.html; BBQGUYS; Caliber CrossFlame Silver 41—Inch Freestanding Propane Gas Grill With Sear Burner and Rotisserie—Wood Handle; Sep. 5, 2015.

http://www.bbqguys.com/item_item_2883786.html; BBQGUYS; Caliber CrassFlame Pro 60—Inch Built-In Natural Gas Grill With Sear Burner and Double Side Burner—Stainless Steel Handle; Sep. 12, 2015.

http://www.promo-wholesale.com/china/Grills/4/Barbecue-Grill---Rectangular-Chrome-Handle-And-Side-Access-95704.htm; Promo-Wholesale.Com; Barbecue Grill—Recstangular Chrome Handle and Slide Access; May 23, 2015.

https://www.grillparts.com/mhp/wnk.asp?product_id=GGHANKIT; Grillparts.com; WNK Stainless Steel "Stay Cool" Handle; Apr. 4, 2015.

http://www.smartstuff.se/pages/engelska/eng_grillen_9.asp; Smart Stuff; Seven tips for grilling a tastier steak.; Oct. 23, 2013.

http://bbq.about.com/od/brinkmanngasgrills/fl/Brinkmann-4-Burner-Propane-Gas-Grill-Model-810-6420-S.htm; About Food; Brinkmann 4-Burner Propane Gas Grill Model #810-6420-S (Discontinued); Sep. 6, 2015.

http://www.goodhousekeeping.com/appliances/outdoor-grill-reviews/a29633/brinkmann-ranger-2-burner-gas-grill-810-4220-5/; Good Housekeeping; Brinkmann Ranger 2-Burner Gas Grill #810-4220-5; Sep. 13, 2015.

http://www.charbroil.com/products/charcoal-grills/box/deluxe-charcoal-box-grill; Char-Broil; Deluxe Charcoal Box Grill; Apr. 19, 2015.

http://www.charbroil.com/products/charcoal-grills; CHAR_BROIL; Charcoal Grills-Ketttleman; Apr. 17, 2015.

http://www.novascan.com/products/acoustic_isolation.php; Novascan; Acoustic Hoods & Mechanical Noise Isolation Chambers for AFM and Sensitive Instruments; May 9, 2008.

http://thefireworks.org/ The Fireworks; Jul. 6, 2015.

http://www.mhpgrills.com/grills/wnk/; MHP Outdoor Grills; WNK 4 Grill; May 25, 2015.

http://www.patioandhearthproductsreport.com/index.php/product/kitchenaid_dual_lid_gas_grill; Patio & Hearth Products Report; Kitchenaid Dual-lid Gas Grill; Aug. 16, 2015.

http://www.rayscomments.com/comment-catagories/barbecue/71-backyard-classi- c-pro-charcoalwood-grill.html; Ray's Comments; Backyard Classic Pro Charcoal/Wood Grill; Jun. 27, 2015.

http://www.kitchenaid.com/shop/accessories-1/major-appliance-accessories-2-/dishwashers-3/-%5bW10708004%5d-5516100/W10708004/; Kitchenaid; Handle Kit w/ two Red Medallions for Panel-Ready Dishwasher; Sep. 5, 2015.

http://web.archive.org/web/20131008210545/http:/prestigedistributioninc.com/towel-bar-round-stainless-steel-asi-0755-ss.html; Prestige Distribution, Inc.; Towel Bar Round Stainless Steel—ASI 0755-SS; Oct. 8, 2013.

http://www.sz-wholesaler.com/p/1172/1184-2/towel-bar-zh-3124-614609.html; SZ-Wholesaler.com; Towel Bar (ZH 3124); Sep. 20, 2014.

https://www.mandmlandscapes.com/; M&M Professional Landscaping; Outdoor Kitchens; Dec. 21, 2014.

http://web.archive.org/web/20150911105612/http:/www.ikea.com/gb/en/; IKEA; Sep. 11, 2015.

Non-Final Office Action for U.S. Appl. No. 29/583,235 dated Apr. 17, 2018.

Non-Final Office Action for U.S. Appl. No. 29/583,239 dated Apr. 17, 2018.

* cited by examiner

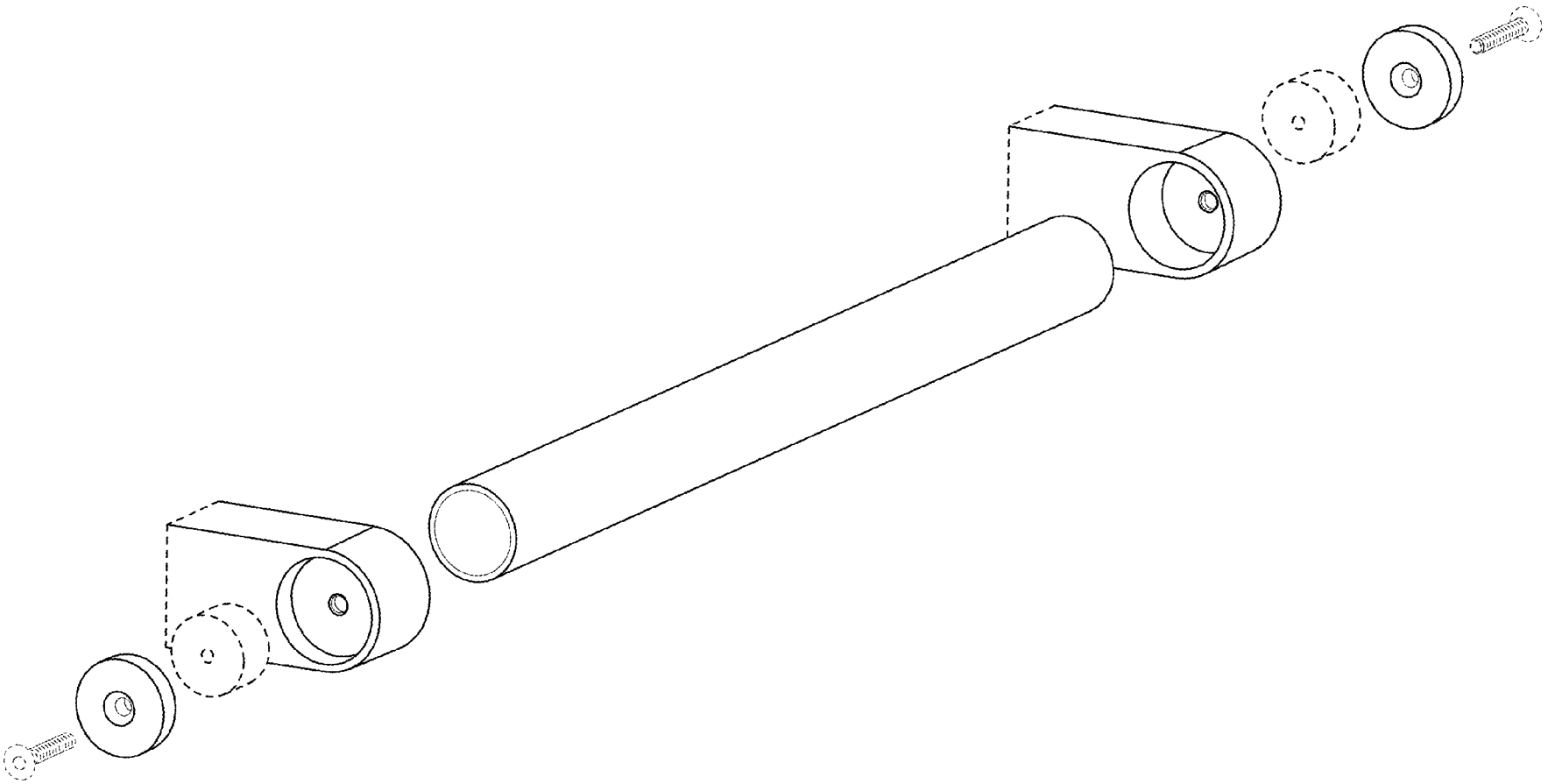
AMENDED
FIG. 9